(12) United States Patent
Nishihara

(10) Patent No.: US 8,547,578 B2
(45) Date of Patent: Oct. 1, 2013

(54) PRINT DRIVER, INFORMATION PROCESSING APPARATUS, AND COMPUTER-READABLE STORAGE MEDIUM FOR GENERATING DIFFERENT TYPES OF DRAWING COMMANDS AND JOB COMMANDS

(75) Inventor: Yoshito Nishihara, Chiba (JP)

(73) Assignee: Ricoh Company, Limited, Tokyo (JP)

( * ) Notice: Subject to any disclaimer, the term of this patent is extended or adjusted under 35 U.S.C. 154(b) by 465 days.

(21) Appl. No.: 12/868,096

(22) Filed: Aug. 25, 2010

(65) Prior Publication Data

US 2011/0063661 A1   Mar. 17, 2011

(30) Foreign Application Priority Data

Sep. 11, 2009   (JP) ................. 2009-211084

(51) Int. Cl.
*G06F 3/12*   (2006.01)
*G06K 1/00*   (2006.01)

(52) U.S. Cl.
USPC ........................... 358/1.15; 358/1.13

(58) Field of Classification Search
USPC ............... 358/1.1, 1.8, 1.13, 1.14, 1.15, 1.18, 358/402

See application file for complete search history.

(56) References Cited

U.S. PATENT DOCUMENTS

| 7,872,765 B2* | 1/2011 | Liu ............................. 358/1.13 |
| 2004/0190057 A1 | 9/2004 | Takahashi et al. |
| 2005/0046886 A1 | 3/2005 | Ferlitsch |
| 2006/0197999 A1* | 9/2006 | Murakami ................... 358/538 |
| 2008/0151298 A1* | 6/2008 | Kurotsu ...................... 358/1.15 |
| 2010/0027043 A1* | 2/2010 | Kato .......................... 358/1.13 |

FOREIGN PATENT DOCUMENTS

| CN | 1521613 A | 8/2004 |
| JP | 09-198213 | 7/1997 |
| JP | 2003-50689 | 2/2003 |
| JP | 2008-97573 | 4/2008 |
| JP | 2008-242661 | 10/2008 |
| JP | 2009-53789 | 3/2009 |
| WO | WO 2008/117807 A1 | 10/2008 |

OTHER PUBLICATIONS

Extended European Search Report issued on Jul. 4, 2012, in patent Application No. 10251431.2.
Combined Chinese Office Action and Search Report issued Dec. 31, 2012 in Patent Application No. 201010503576.1 with English Translation.
Office Action mailed on Jul. 30, 2013, in counterpart Japanese Application No. 2009-211084 (2 pages).

* cited by examiner

*Primary Examiner* — Gabriel Garcia
(74) *Attorney, Agent, or Firm* — Oblon, Spivak, McClelland, Maier & Neustadt, L.L.P.

(57) ABSTRACT

A printer driver includes a job command generation module storage unit that stores therein a plurality of job command generation modules for generating a job command, a drawing command generation module storage unit that stores therein a plurality of drawing command generation modules for generating a drawing command to instruct a printer to print an image, a determining unit that determines a combination of the job command generation module stored in the job command generation module storage unit and the drawing command generation module stored in the drawing command generation module storage unit, a generation requesting unit that requests the determined job command generation module and drawing command generation module to generate a command, and a transmitting unit that transmits the generated job command and drawing command to the printer.

11 Claims, 10 Drawing Sheets

PRINT DRIVER, INFORMATION PROCESSING APPARATUS, AND COMPUTER-READABLE STORAGE MEDIUM FOR GENERATING DIFFERENT TYPES OF DRAWING COMMANDS AND JOB COMMANDS

CROSS-REFERENCE TO RELATED APPLICATIONS

The present application claims priority to and incorporates by reference the entire contents of Japanese Patent Application No. 2009-211084 filed in Japan on Sep. 11, 2009.

BACKGROUND OF THE INVENTION

1. Field of the Invention

The present invention relates to a printer driver, an information processing apparatus, and a computer-readable storage medium.

2. Description of the Related Art

Conventionally, a printer driver needs to be installed to send print commands to a printer from a host computer such as a personal computer (PC). In the printer driver, various types of print commands are used to instruct the printer to print. Based on a request from the host computer, the printer driver sends print commands to the printer. The print commands to be transmitted are often divided into job commands and drawing commands.

The job commands include commands for mechanically controlling the printer such as a staple command, a command to set the number of copies, and a command to perform double-sided printing. The drawing commands include information on what kind of drawing to create (e.g., to draw a circle or to draw a line).

The job commands and the drawing commands have several specifications. For example, Printer Job Language (PJL) and Job Definition Format (JDF) are the specifications for the job commands. PostScript, Printer Control Language (PCL), Refined Print Command Stream (RPCS), and the like are the typical specifications for the drawing commands.

A job command and a drawing command with different specifications are combined according to the platform (software for controlling the printer) of the printer to be used. Commands that can be used for the printer are defined by the platform (software for controlling the printer) of each printer. For example, PJL is used as a job command and PostScript is used as a drawing command for a certain printer. JDF is used as a job command and PCL is used as a drawing command for another printer.

Accordingly, to make a printer driver applicable to a plurality of printers, the printer driver must correspond to a plurality of commands with different specifications. For example, Japanese Patent Application Laid-open No. 2009-053789 discloses a technology of converting a command to a plurality of drawing commands. Accordingly, a print request can be sent to the printers that respond to different drawing commands.

Although Japanese Patent Application Laid-open No. 2009-053789 discloses the technology of corresponding to a plurality of types of printers that responds to different drawing commands, job commands are not considered in any way.

SUMMARY OF THE INVENTION

It is an object of the present invention to at least partially solve the problems in the conventional technology.

According to an aspect of the present invention, there is provided a printer driver that includes a job command generation module storage unit configured to store therein a plurality of job command generation modules that generates a job command related to a print job for a printer; a drawing command generation module storage unit configured to store therein a plurality of drawing command generation modules that are different from the job command generation modules and generates a drawing command describing a drawing image to instruct a printer to print the image; a determining unit configured to determine a combination of the job command generation module stored in the job command generation module storage unit and the drawing command generation module stored in the drawing command generation module storage unit to be used for a printer by which printing is performed; a generation requesting unit configured to request the job command generation module and the drawing command generation module determined by the determining unit to generate a command; and a transmitting unit configured to transmit a job command generated by the job command generation module and a drawing command generated by the drawing command generation module to the printer by which printing is performed.

According to another aspect of the present invention, there is provided an information processing apparatus that includes a job command module storage unit configured to store therein a plurality of job command generation modules that generates a job command related to a print job for a printer; a drawing command generation module storage unit configured to store therein a plurality of drawing command generation modules that are different from the job command generation modules and generates a drawing command describing a drawing image to instruct a printer to print the image; a determining unit configured to determine a combination of the job command generation module stored in the job command generation module storage unit and the drawing command generation module stored in the drawing command generation module storage unit to be used for a printer by which printing is performed; a generation requesting unit configured to request the job command generation module and the drawing command generation module determined by the determining unit to generate a command; and a transmitting unit configured to transmit a job command generated by the job command generation module and a drawing command generated by the drawing command generation module to the printer by which printing is performed.

According to still another aspect of the present invention, there is provided a computer readable storage medium having computer-readable program codes embodied in the medium for processing information in an information processing apparatus that includes a job command module storage unit, a drawing command generation module storage unit, a determining unit, a generation requesting unit, and a transmitting unit. The program codes when executed causes a computer to execute storing, in the job command module storage unit, a plurality of job command generation modules that generates a job command related to a print job for a printer; storing in the drawing command generation module storage unit, a plurality of drawing command generation modules that are different from the job command generation modules and generates a drawing command describing a drawing image to instruct a printer to print the image; determining, using the determining unit, a combination of the job command generation module stored in the job command generation module storage unit and the drawing command generation module stored in the drawing command generation module storage unit to be used for a printer by which printing is performed;

generating, using the generation requesting unit, the job command generation module and the drawing command generation module determined by the determining unit to generate a command; and transmitting, using the transmitting unit, a job command generated by the job command generation module and a drawing command generated by the drawing command generation module to the printer by which printing is performed.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a printer driver, an information processing apparatus, and a computer-readable storage medium according to the present invention will be described below in greater detail with reference to the accompanying drawings.

First Embodiment

Figure 1:
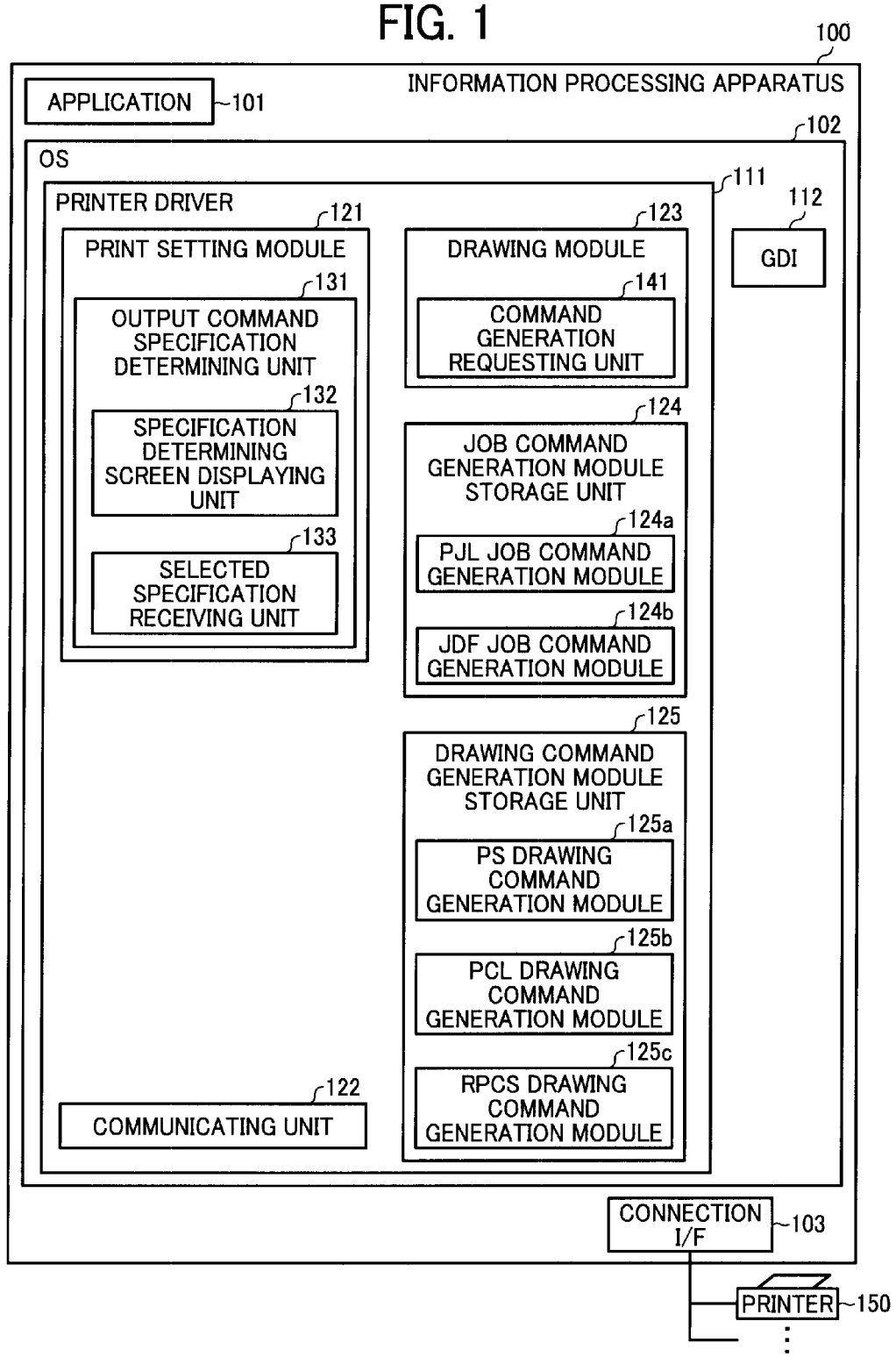
FIG. 1 is a schematic of an information processing apparatus according to a first embodiment of the present invention.

FIG. 1 is a schematic of an information processing apparatus 100 according to a first embodiment of the present invention. As illustrated in FIG. 1, the information processing apparatus 100 includes an application 101, an operating system (OS) 102, and a connection interface (I/F) 103. The connection I/F 103 is connected with printers 150 through a network. Accordingly, the information processing apparatus 100 can send print requests to the printers 150.

The printer 150 carries out a printing operation based on a print request received from an operating unit (not illustrated) of the printer 150. The printer 150 includes an interface connected to the information processing apparatus 100, and carries out a printing operation based on a print request received from the connected information processing apparatus 100 through the network. A multifunction product having at least two functions among a copying function, a printing function, a scanning function, and a facsimile function is applied to the printer 150 according to the present embodiment. The printer 150 may also be a printer that only performs printing operation instead of the multifunction product. A plurality of types of printers 150 may be connected to the information processing apparatus 100 according to the present embodiment, and hereafter, the printers 150 are referred to as printers A to C.

Figure 2:
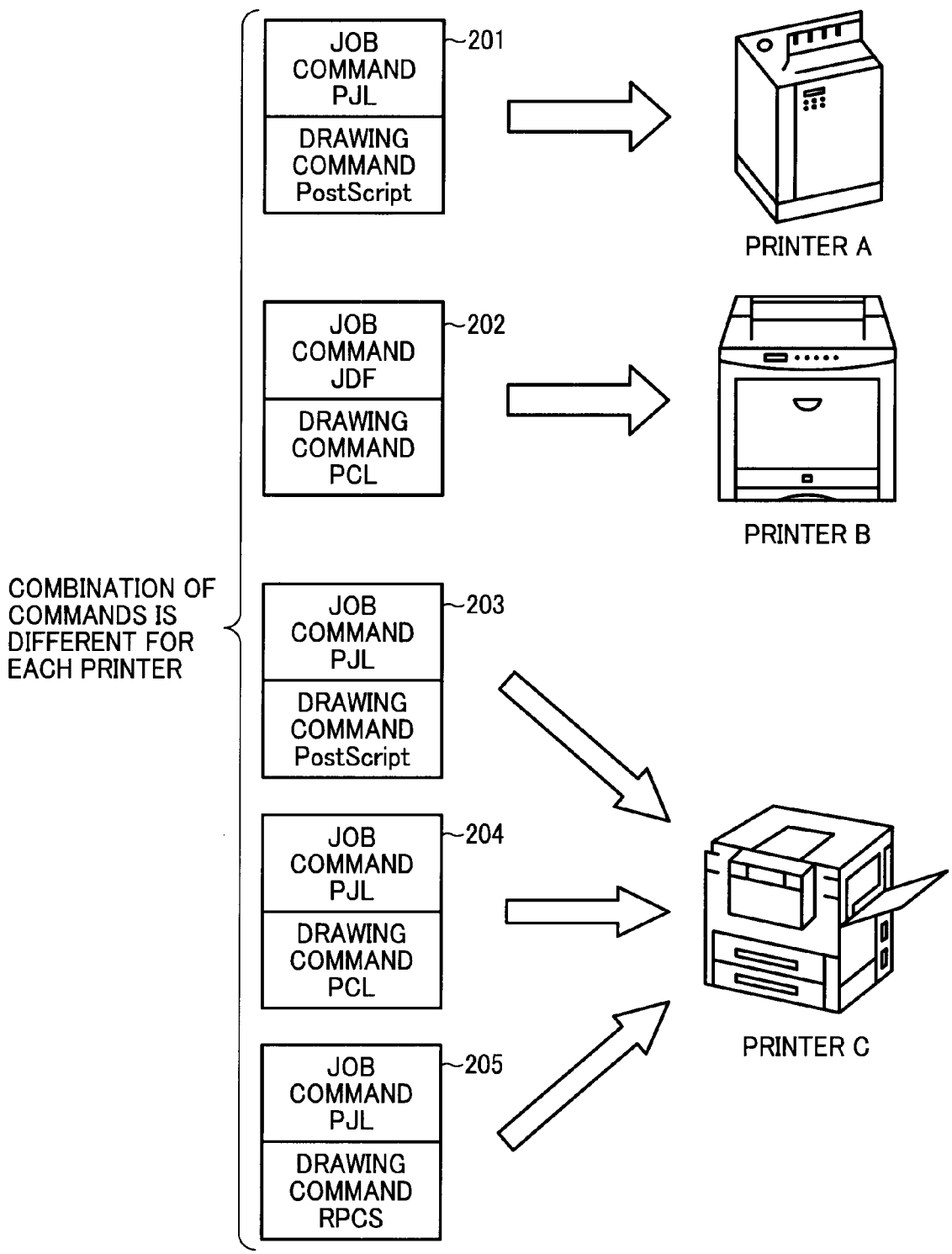
FIG. 2 is a schematic for explaining a plurality of types of printers connectable to the information processing apparatus.

FIG. 2 is a schematic for explaining a plurality of types of printers connectable to the information processing apparatus 100. The printer A illustrated in FIG. 2 responds to a combination 201 of PJL as a job command and PostScript as a drawing command. The printer B responds to a combination 202 of JDF as a job command and PCL as a drawing command.

The printer does not just support one combination of a job command and a drawing command. For example, as indicated in the printer C in FIG. 2, the printer can respond to a plurality of combinations. In other words, the printer C can respond to a combination 203 of PJL and PostScript, a combination 204 of PJL and PCL, and a combination 205 of PJL and RPCS.

A conventional printer driver can only transmit a command of a particular specification to a printer. Accordingly, if the specification of a command is different from that to which the printer responds, a printer driver that meets the specification must be installed. To solve such a problem, a printer driver that supports a plurality of drawing commands is sought after. Accordingly, a printer driver that switches drawing commands as described below has been proposed.

Figure 3:
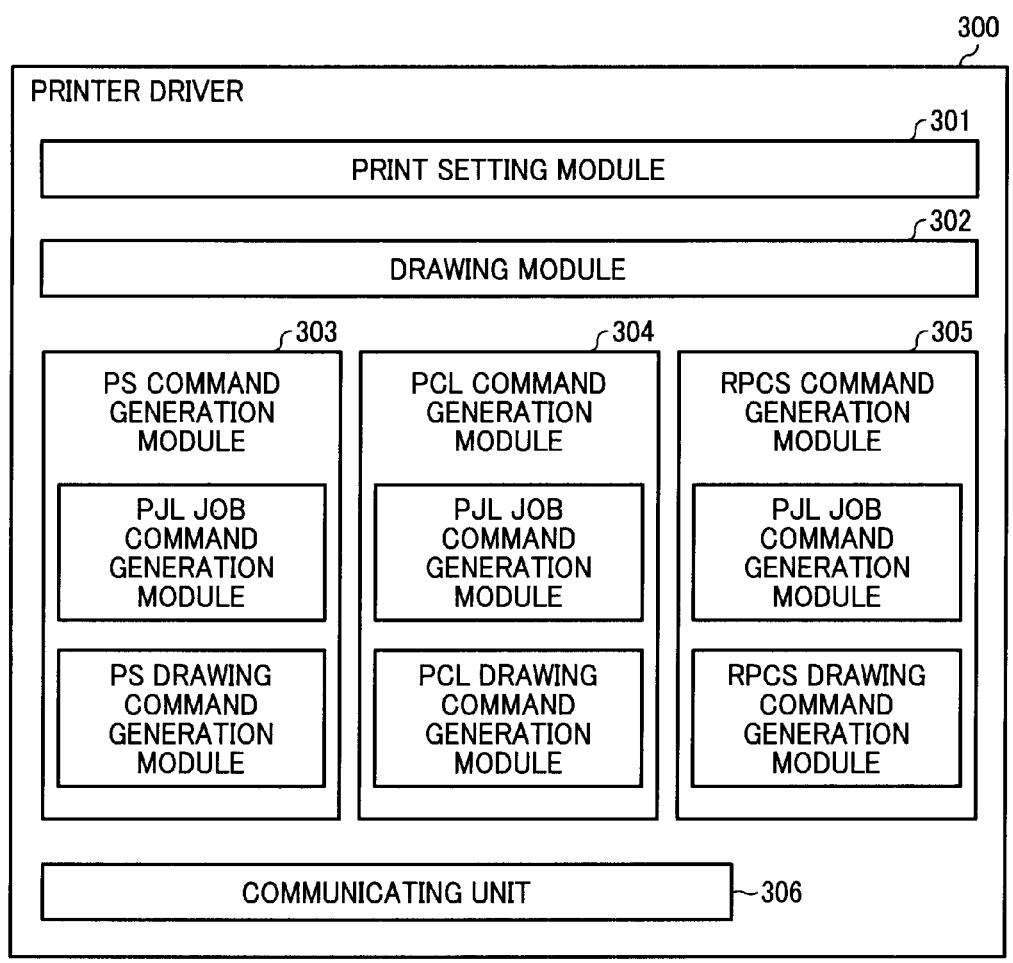
FIG. 3 is a schematic of an example of a conventional printer driver capable of switching drawing commands.

FIG. 3 is a schematic of an example of a conventional printer driver 300 capable of switching drawing commands. As illustrated in FIG. 3, the conventional printer driver 300 includes a print setting module 301, a drawing module 302, a Postscript (PS) command generation module 303, a PCL command generation module 304, an RPCS command generation module 305, and a communicating unit 306. The print setting module 301, the drawing module 302, and the communicating unit 306 are considered to have the same configuration as those of a printer driver 111 of the present embodiment, and the detailed descriptions thereof will be omitted.

The PS command generation module 303 includes a PJL job command generation module and a PS drawing command generation module. The PCL command generation module 304 includes a PJL job command generation module and a PCL drawing command generation module. The RPCS command generation module 305 includes a PJL job command generation module and an RPCS drawing command generation module.

In other words, in the conventional printer driver 300, a job command to be used is combined with a drawing command in advance. Accordingly, the job command and the drawing command cannot be used in a different combination.

Figure 4:
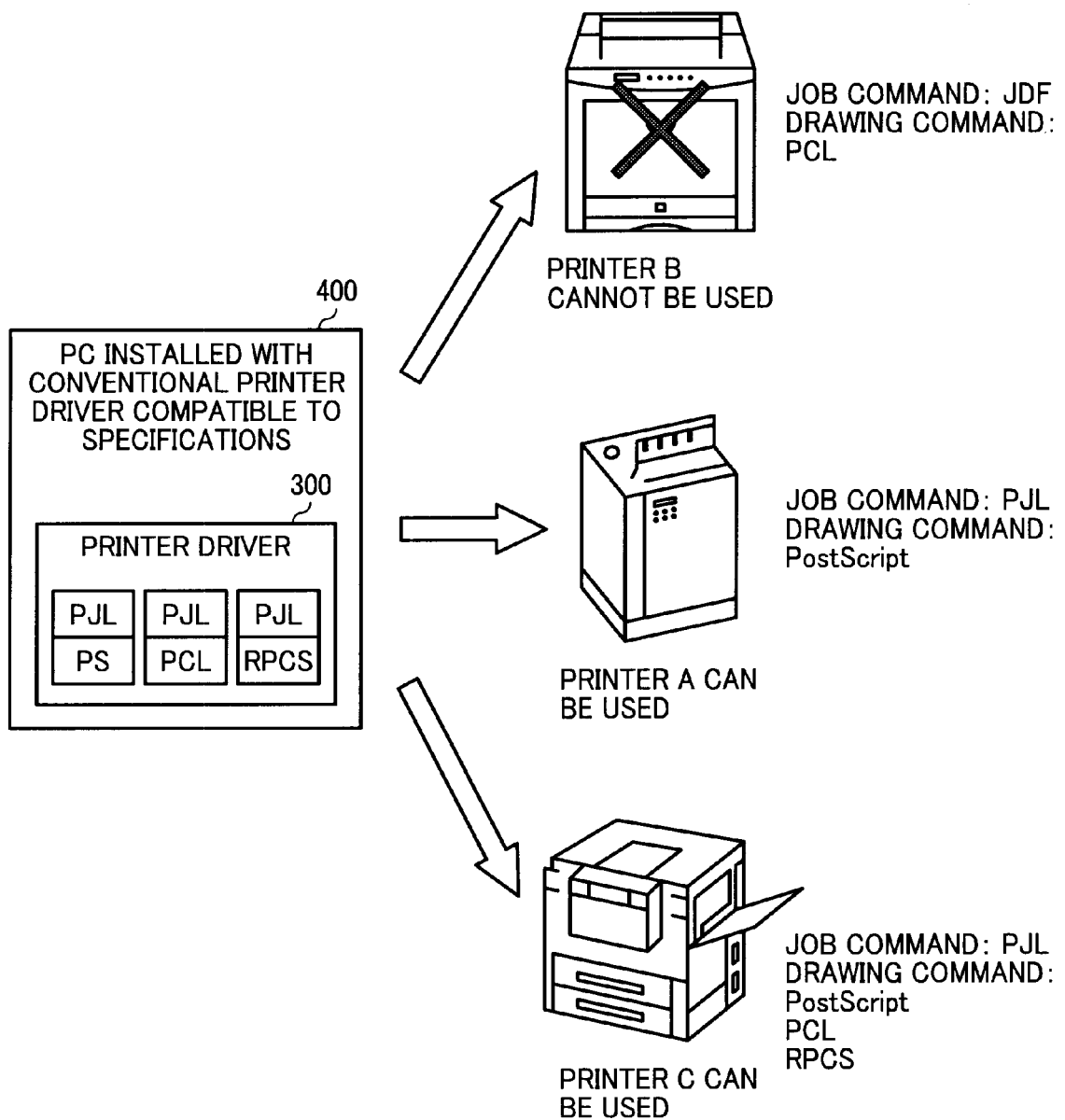
FIG. 4 is a schematic for explaining an example when print requests are sent to printers from the conventional printer driver.

FIG. 4 is a schematic for explaining an example when print requests are sent to printers from the conventional printer driver 300 installed in a PC 400. As illustrated in FIG. 4, the conventional printer driver 300 only corresponds to a combination of PJL and PS, a combination of PJL and PCL, and a combination of PJL and RPCS. Accordingly, it is possible to use the printer A that only receives a print request of the combination of PJL and PostScript. It is also possible to use the printer C that receives a print request of the combination of PJL and PostScript, the combination of PJL and PCL, and the combination of PJL and RPCS.

However, the conventional printer driver 300 cannot send a print request to the printer B that only responds to a print request of a combination of JDF and PCL. In this manner, even if the conventional printer driver 300 corresponds to the drawing command PCL, because the printer driver 300 does not corresponds to the combination of the drawing command PCL and a job command JDF, a print request cannot be sent to the printer B. In contrast, with the printer driver 111 according to the present embodiment, a print request can be sent by any combination, as long as the job command and the drawing command are supported by the printer driver 111.

The application 101 of the information processing apparatus 100 is software that runs on the OS 102, which will be described later. The application 101 sends a print request to the OS 102.

The OS 102 includes the printer driver 111 and a Graphics Device Interface (GDI) 112, and controls the entire information processing apparatus 100.

The GDI 112 is one of subsystems in the OS 102 and performs a drawing operation. When the OS 102 receives a print request from the application 101 and the like, the GDI 112 calls the printer driver 111 and requests a printing operation.

The printer driver 111 includes a print setting module 121, a communicating unit 122, a drawing module 123, a job command generation module storage unit 124, and a drawing command generation module storage unit 125.

The job command generation module storage unit 124 stores therein a plurality of job command generation modules for generating a job command that requests various printers to process a print job. The job command generation module storage unit 124 according to the present embodiment includes a PJL job command generation module 124a and a JDF job command generation module 124b.

The PJL job command generation module 124a is a module for generating a job command corresponding to PJL, based on a request from the drawing module 123. The JDF job command generation module 124b is a module for generating a job command corresponding to JDF, based on a request from the drawing module 123. The job commands generated by the modules are used to output to the printer 150.

The drawing command generation module storage unit 125 stores therein a plurality of drawing command modules for generating a drawing command used to describe a drawing image and instruct a printer to print the image. The drawing command generation module storage unit 125 according to the present embodiment includes a PS drawing command generation module 125a, a PCL drawing command generation module 125b, and an RPCS drawing command generation module 125c.

The print setting module 121 includes an output command specification determining unit 131 and performs setting so that the printer to which a print request is sent carries out printing.

The output command specification determining unit 131 includes a specification determining screen displaying unit 132 and a selected specification receiving unit 133, and determines a combination of a job command generation module and a drawing command generation module to be used for the printer by which printing is performed. In the present embodiment, the modules are determined based on a selecting operation of the user. A structure for determining the modules will now be described.

Figure 5:
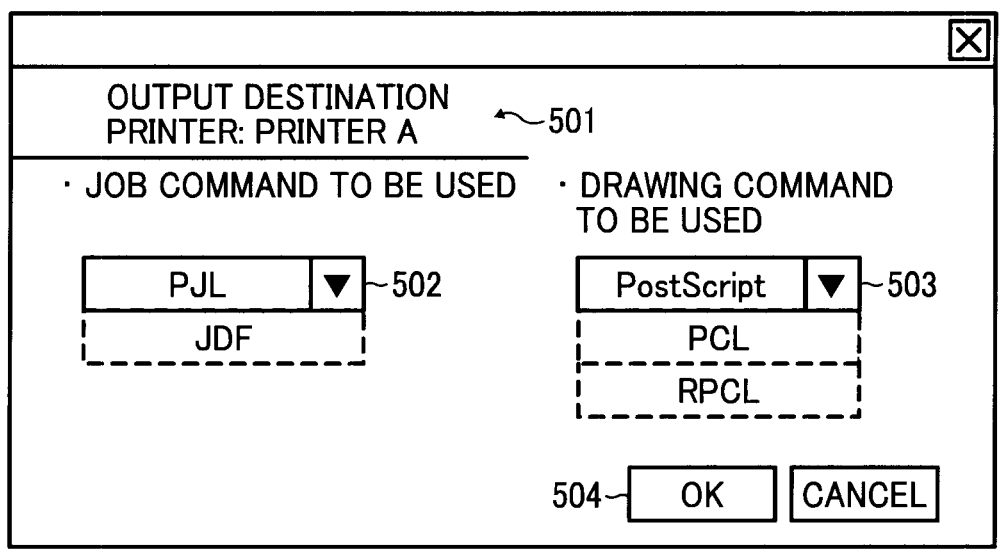
FIG. 5 is a schematic of a screen example displayed by a specification determining screen displaying unit.

The specification determining screen displaying unit 132 performs an operation to display a screen for determining the specification on a displaying unit (not illustrated) of the information processing apparatus 100. The operation is performed through the GDI 112. FIG. 5 is a schematic of a screen example displayed by the specification determining screen displaying unit 132. As illustrated in FIG. 5, a printer name 501 of a printer serving as an output destination is displayed on the screen. A job command selection column 502 from which a job command to be used for the printer indicated by the printer name 501 is selected, and a drawing command selection column 503 from which a drawing command is selected, are also displayed on the screen.

The selected specification receiving unit 133 receives the columns selected from the screen displayed by the specification determining screen displaying unit 132. In other words, the selected specification receiving unit 133 receives the job command selected from the job command selection column 502 and the drawing command selected from the drawing command selection column 503.

The output command specification determining unit 131 determines a job command generation module and a drawing command generation module corresponding to the commands that are selected and received, as modules for generating commands output to the printer indicated by the printer name 501.

The drawing module 123 includes a command generation requesting unit 141, and generates a command corresponding to a print request from the GDI 112 and the like. The drawing module 123 generates two types of commands as follows:

One of the types of commands is a drawing command that describes data on an object to be printed, such as a line and a graphic image. The drawing command is generated by the PS drawing command generation module 125a, the PCL drawing command generation module 125b, and the RPCS drawing command generation module 125c.

The other type of command is a job command that has nothing to do with the object to be printed, but describes information on various types of jobs for each vender such as the setting of finisher, a job name, or a user name. The job command is generated by the PJL job command generation module 124a and the JDF job command generation module 124b.

The command generation requesting unit 141 requests the job command generation module and the drawing command generation module determined by the output command specification determining unit 131, to generate a command to be sent to the printer.

At this time, to make the command generation modules generate commands, the command generation requesting unit 141 transfers the timings in the printing sequence and a print setting required to generate a command, to the command generation modules.

In the present embodiment, the timings in the printing sequence include start of printing (job), start of a document, start of a page, end of the page, end of the document, and end of printing. Regardless of the timing, the basic operation of the job command generation module and the drawing command generation module remains the same.

The communicating unit 122, based on a generation request from the command generation requesting unit 141, transmits a job command generated by the job command generation module and a drawing command generated by the drawing command generation module, to the printer (such as the printer A) to which the print request is sent.

Figure 6:
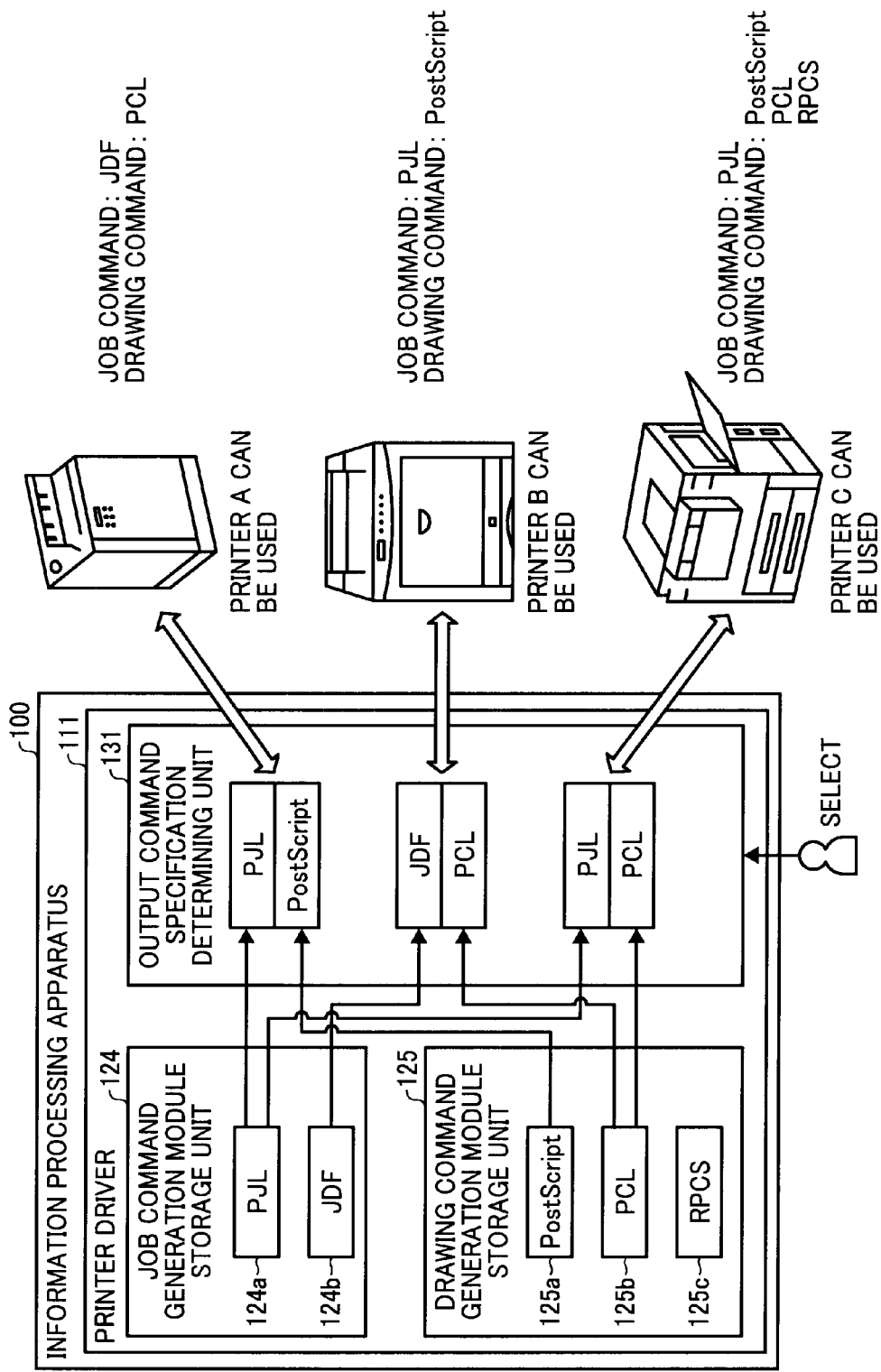
FIG. 6 is a schematic of a concept when print requests are sent by combinations of commands determined by the information processing apparatus according to the first embodiment.

FIG. 6 is a schematic of a concept when print requests are sent in combinations of the commands determined in the information processing apparatus 100 according to the first embodiment. It is assumed that the user has selected PJL and PostScript for the printer A, JDF and PCL for the printer B, and PJL and PCL for the printer C in advance. In an example illustrated in FIG. 6, the information processing apparatus 100 sends print requests to the printers, based on the combinations of commands selected by the user.

More specifically, the information processing apparatus 100 outputs a job command generated by the PJL job command generation module 124a and a drawing command generated by the PS drawing command generation module 125a to the printer A. The information processing apparatus 100 also outputs a job command generated by the JDF job command generation module 124b and a drawing command generated by the PCL drawing command generation module 125b to the printer B. The information processing apparatus 100 also outputs a job command generated by the PJL job command generation module 124a and a drawing command generated by the PCL drawing command generation module 125b to the printer C. In this manner, in the present embodiment, a command such as a print request is output to each printer in a combination of commands selected by the user. Accordingly, it is possible to flexibly respond to each of the printers.

Figure 7:
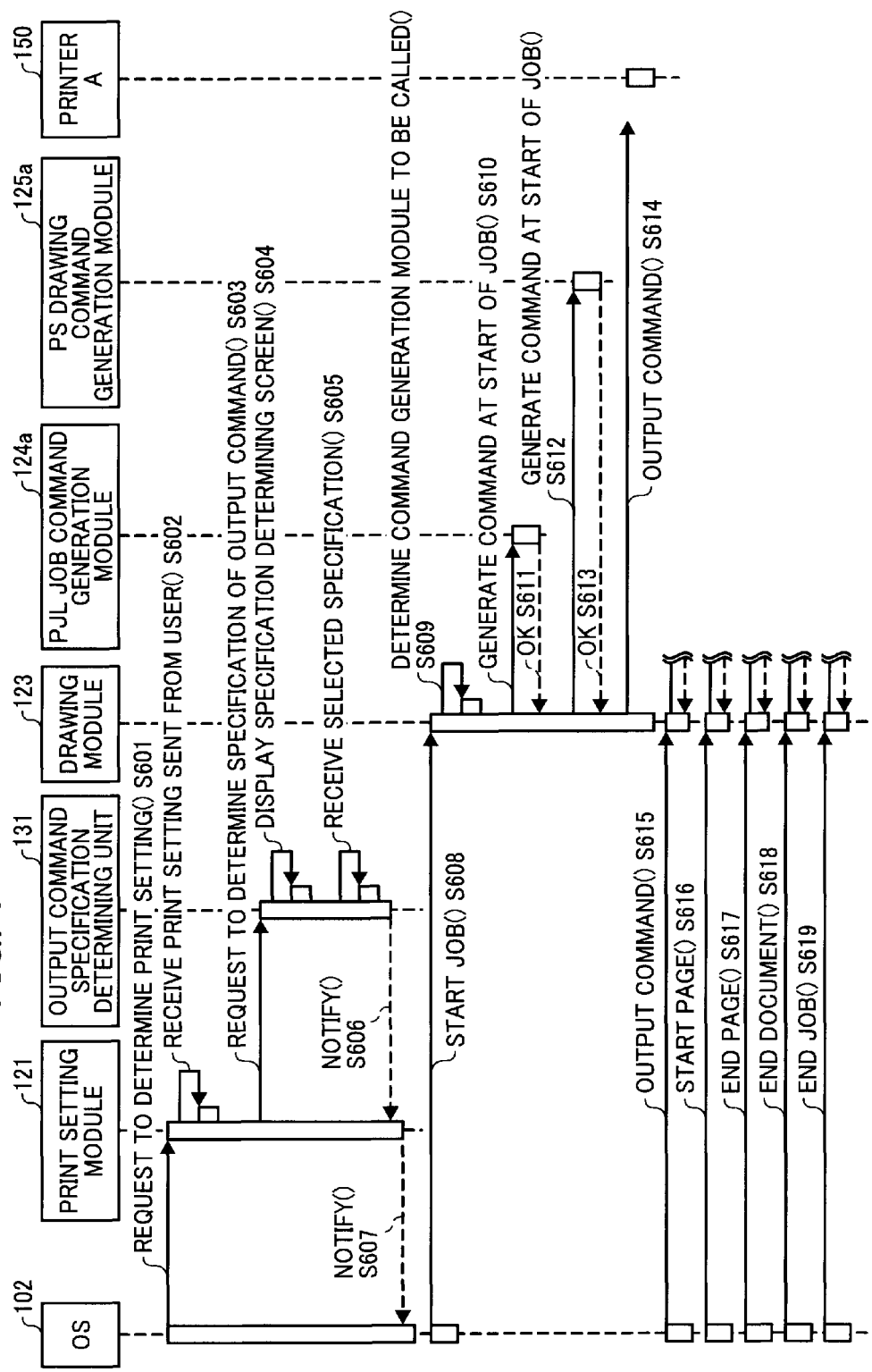
FIG. 7 is a sequence diagram of a procedure of requesting a printer A to perform a printing operation in the information processing apparatus according to the first embodiment.

A procedure of requesting the printer A to perform a printing operation in the information processing apparatus 100 according to the present embodiment formed in this manner will now be described. FIG. 7 is a sequence diagram of a procedure of the operation performed in the information processing apparatus 100 according to the present embodiment. To begin with, the setting for sending a print request is carried out. If the setting has already been made, processes from Step S601 to Step S605 may be omitted.

The OS 102 requests the print setting module 121 to determine print setting (Step S601). The print setting module 121 receives a print setting sent from the user (Step S602).

To determine the print setting during printing, a specification of a command transmitted during printing is determined. Accordingly, the print setting module 121 requests the output command specification determining unit 131 to determine the specification of the output command (Step S603).

Upon receiving the request to determine the specification, the specification determining screen displaying unit 132 displays a specification determining screen (Step S604). The selected specification receiving unit 133 then receives the specification of the command selected by the user on the specification determining screen (Step S605). Accordingly, the specifications of the job command and the drawing command to be used for sending a print request are determined.

The output command specification determining unit 131 notifies the print setting module 121 that the specifications are determined (Step S606). The print setting module 121 notifies the OS 102 that the print setting has been finished (Step S607).

The OS 102 then requests the drawing module 123 to start a job (Step S608). At this time, a print setting value determined by the print setting module 121 is transferred to the drawing module 123 from the OS 102. The print setting value includes the specifications of the job command and the drawing command to be output.

The command generation requesting unit 141 of the drawing module 123 that has received the start request determines command generation modules to be called, based on the specifications of the job command and the drawing command included in the transferred print setting value (Step S609). In the present sequence, it is assumed that the command generation modules are the PJL job command generation module 124a and the PS drawing command generation module 125a. At this time, if the determined command generation modules are not loaded, a loading operation is to be carried out.

The command generation requesting unit 141 requests the PJL job command generation module 124a to generate a command at start of the job (Step S610). The drawing module 123 receives a job command generated by the PJL job command generation module 124a (Step S611).

The command generation requesting unit 141 requests the PS drawing command generation module 125a to generate a command at start of the job (Step S612). The drawing module 123 receives a drawing command generated by the PS drawing command generation module 125a (Step S613).

The drawing module 123 then transmits the generated job command and the drawing command to the printer A through the communicating unit 122 (Step S614).

The OS 102 requests the drawing module to start a document (Step S615). The OS 102 also requests the drawing module to start a page (Step S616).

The OS 102 then requests the drawing module to end the page (Step S617). The OS 102 then requests the drawing module to end the document (Step S618). The OS 102 finally requests the drawing module to end the job (Step S619). Although omitted, the similar processes from Steps S610 to S614 are also performed at each of Steps S615 to S619.

The combination of commands generated based on the specifications selected by the user is output to the printer by using the processing procedure described above.

Figure 8:
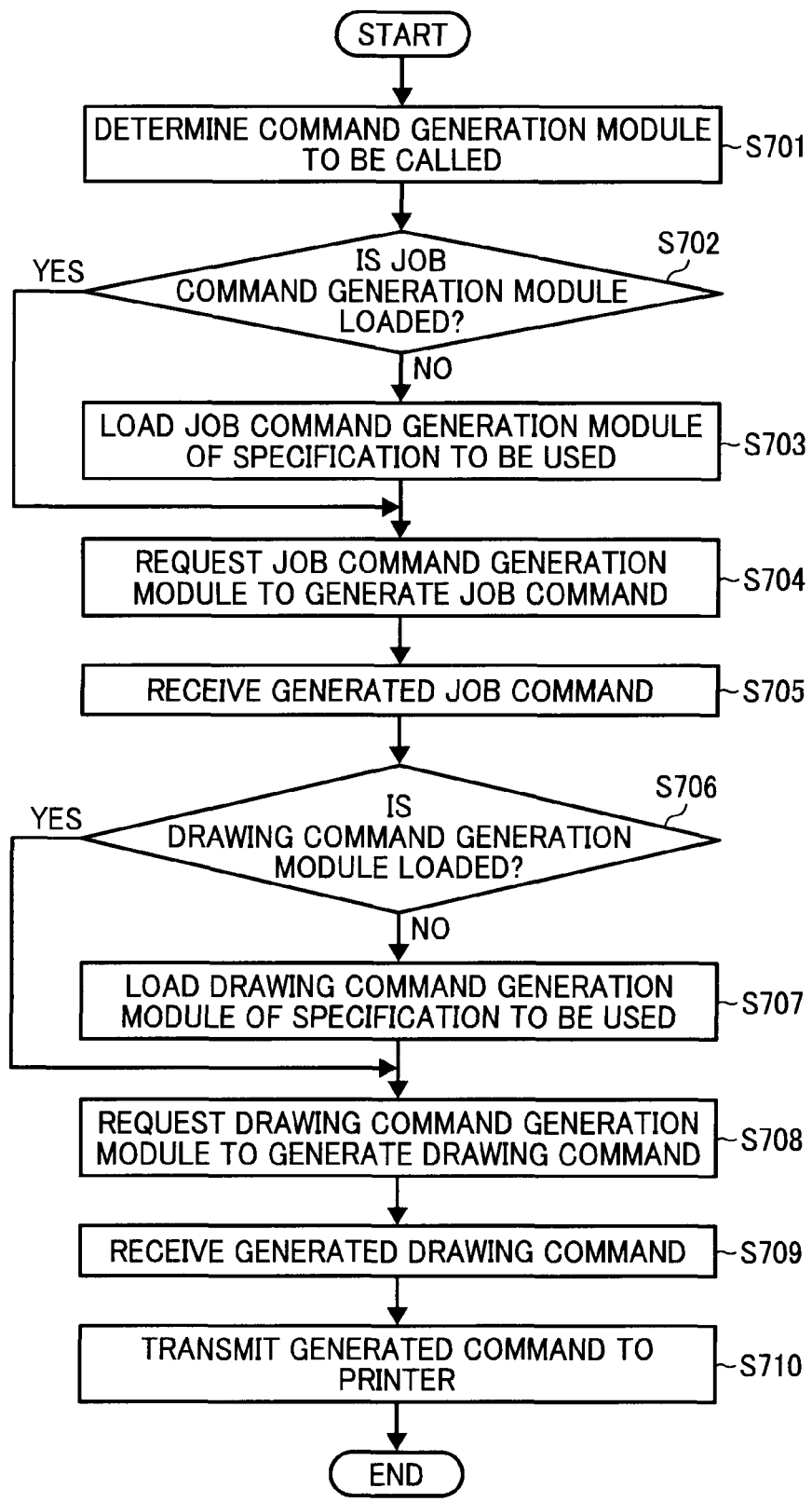
FIG. 8 is a flowchart of a specific processing procedure until a command is transmitted in the information processing apparatus according to the first embodiment.

A particular operation until a command is transmitted in the information processing apparatus 100 according to the present embodiment will now be described. FIG. 8 is a flowchart of a processing procedure in the information processing apparatus 100 according to the present embodiment. It is assumed that the output command specification determining unit 131 has already determined the specifications of the output commands.

The command generation requesting unit 141 of the drawing module 123 determines command generation modules to be called, based on the specifications of the job command and the drawing command included in the print setting value transmitted from the OS 102 (Step S701).

The drawing module 123 then determines whether the job command generation module to be called is already loaded (Step S702). If the job command generation module is already loaded (Yes at Step S702), the drawing module 123 proceeds to Step S704 without performing particular processing.

If the job command generation module is not yet loaded (No at Step S702), the drawing module 123 loads the job command generation module to be called on the memory, which will not be illustrated (Step S703). Accordingly, the job generation module can be used. The PJL job command generation module 124a, the JDF job command generation module 124b, or the like is a module to be loaded.

The command generation requesting unit 141 requests the determined job command generation module to generate a job command (Step S704). Accordingly, the job command generation module generates a job command.

The drawing module 123 receives the generated job command from the job command generation module (Step S705).

The drawing module 123 then determines whether a drawing command generation module to be called is already loaded (Step S706). If the drawing command generation module is already loaded (Yes at Step S706), the drawing module 123 proceeds to Step S708 without performing particular processing.

If the drawing command generation module is not yet loaded (No at Step S706), the drawing module 123 loads the drawing command module to be called on the memory, which will not be illustrated (Step S707). Accordingly, the drawing generation module can be used. The PS drawing command generation module 125a, the PCL drawing command generation module 125b, or the RPCS drawing command generation module 125c is a module to be loaded.

The command generation requesting unit 141 requests the determined drawing command generation module to generate a drawing command (Step S708). Accordingly, the drawing command generation module generates a drawing command.

The drawing module 123 then receives the generated drawing command from the drawing command generation module (Step S709).

The drawing module 123 then transmits the generated job command and drawing command to the printer 150 through the communicating unit 122 (Step S710).

Accordingly, the commands generated by the job command generation module and the drawing command generation module are transmitted to the printer by using the processing procedure described above.

In the present embodiment, the compatible job command is not limited to PJL or JDF, but may be any job command. Similarly, a drawing command other than PostScript, PCL, and RPCS may be used as the drawing command. The printer driver may be installed in any information processing apparatus such as various mobile terminals in addition to the PC.

The information processing apparatus 100 according to the present embodiment can solve a conventional problem in which even if a printer supports drawing commands of three types of specifications, the printer cannot be controlled if the specification of the job command is different. The information processing apparatus 100 can control printers with one printer driver, even if the specifications of the job commands are different in addition to the drawing commands.

Because the printers that respond to different specifications of the job command can be controlled with one printer driver 111, it is possible to improve the convenience of the user.

Second Embodiment

In the first embodiment, the command generated based on the specification of command selected by the user is transmitted to the printer. However, the determination of the specification of command is not limited to the selection made by the user. In a second embodiment, a method of determining the specification by communicating with a printer will be described.

Figure 9:
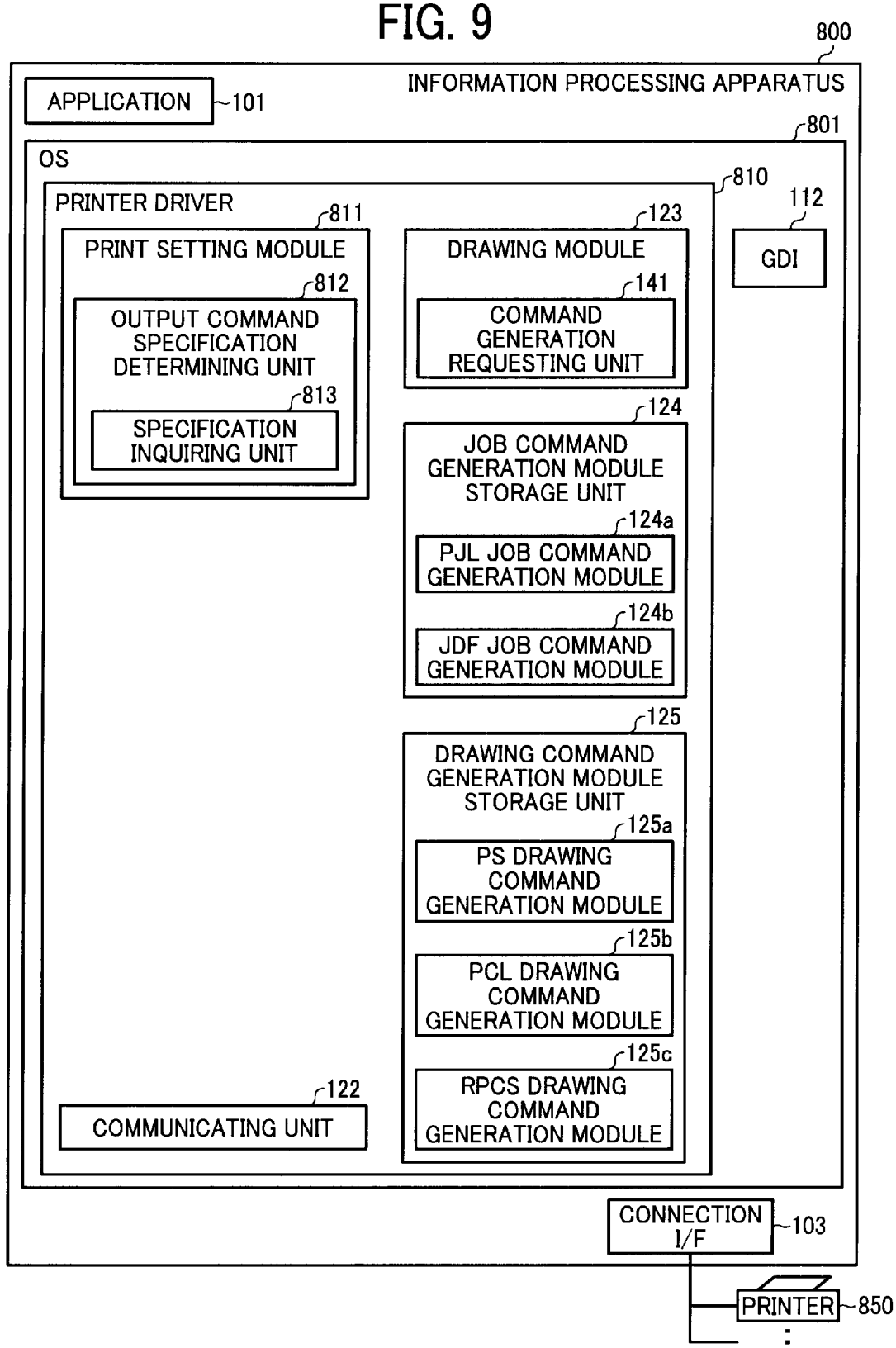
FIG. 9 is a schematic of an information processing apparatus according to a second embodiment of the present invention.

FIG. 9 is a schematic of an information processing apparatus 800 according to the second embodiment of the present invention. In the information processing apparatus 800 illustrated in FIG. 9, a print setting module 811 of a printer driver 810 mounted on an OS 801 is different from the print setting module 121 according to the first embodiment. The same members as those in the first embodiment are denoted by the same reference numerals, and the detailed descriptions thereof will be omitted.

A printer 850 according to the present embodiment transmits the specifications of a job command and a drawing command used to communicate with the information processing apparatus 800. The similar operation with that of the printer according to the first embodiment is carried out for the rest.

The print setting module 811 has the same structure as that of the print setting module 121 of the first embodiment, except the print setting module 811 includes an output command specification determining unit 812.

The output command specification determining unit 812 includes a specification inquiring unit 813, and determines a combination of a job command generation module and a drawing command generation module to be used for the printer by which printing is performed. In the present embodiment, modules are determined by communicating with the printer by which printing is performed.

The specification inquiring unit 813 inquires the printer 850 to which a print request is sent of the specifications of the job command and drawing command that can be used. The job command generation module and the drawing command generation module to be used are determined by the inquiry result.

Figure 10:
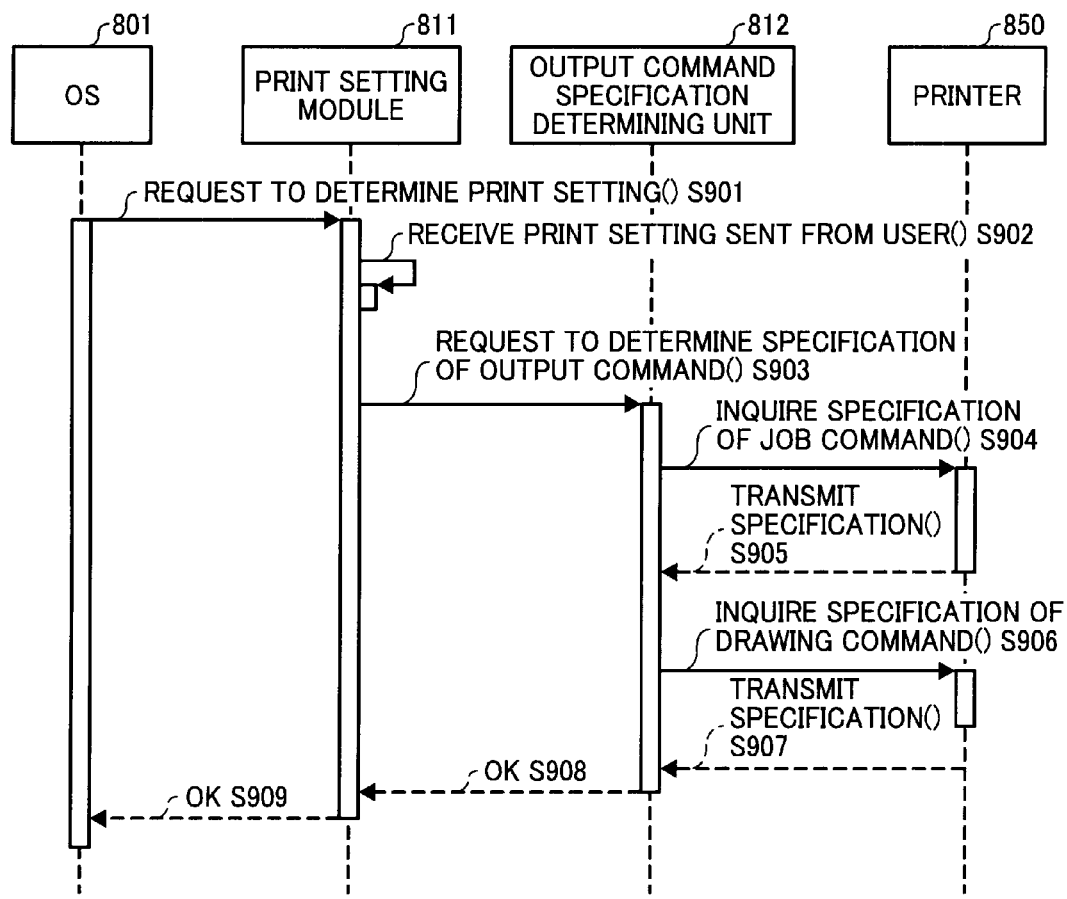
FIG. 10 is a sequence diagram of a procedure when the specification of a command to the printer A is determined in the information processing apparatus according to the second embodiment.

A procedure for determining the specification of a command sent to the printer 850 in the information processing apparatus 800 according to the present embodiment formed in this manner will now be described. FIG. 10 is a sequence diagram of a processing procedure in the information processing apparatus 800 according to the present embodiment.

The OS 801 requests the print setting module 811 to determine print setting (Step S901). The print setting module 811 receives a print setting sent from the user (Step S902). The print setting module 811 then requests the output command specification determining unit 812 to determine the specification of an output command (Step S903).

Upon receiving the request to determine the specification, the specification inquiring unit 813 of the output command specification determining unit 812 inquires the printer 850 by which printing is performed of the specification of a job command, through the communicating unit 122 (Step S904). The printer 850 then transmits the specification of the applicable job command to the information processing apparatus 800 (Step S905).

The specification inquiring unit 813 also inquires the printer 850 by which printing is performed of the specification of a drawing command, through the communicating unit 122 (Step S906). The printer 850 then transmits the specification of the applicable drawing command to the information processing apparatus 800 (Step S907). Accordingly, the specifications of the job command and the drawing command used to send a print request are determined.

The output command specification determining unit 812 notifies the print setting module 811 that the specifications are determined (Step S908). The print setting module 811 then notifies the OS 801 that the print setting has been finished (Step S909).

The specifications of the job command and the drawing command applicable to the printer 850 are determined by the processing procedure described above. After the processing procedure in FIG. 9 is finished, a request to start a job and the like is performed. Because the other operations are the same as those in the first embodiment, the descriptions thereof are omitted.

Modification

The determination of a combination of a job command and a drawing command is not limited to the selection made by the user or by the bidirectional communication with the printer as described in the first and second embodiments. For example, a combination of a job command and a drawing command may be determined by referring to an external file distributed by a server on the network.

Figure 11:
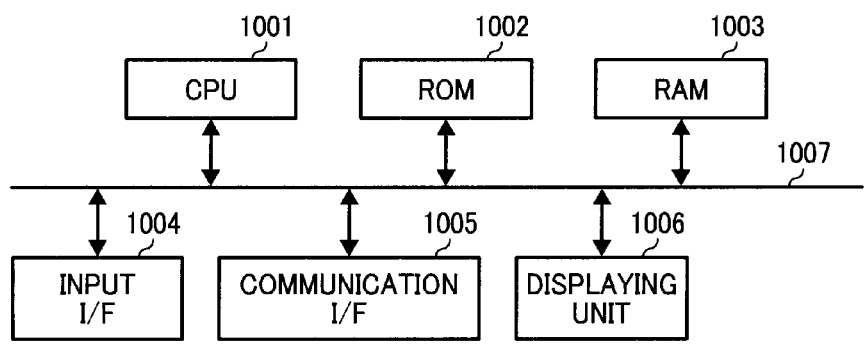
FIG. 11 is a schematic of a hardware configuration of the information processing apparatus.

The information processing apparatuses 100 and 800 of the embodiments, as illustrated in FIG. 11, include a CPU 1001, a read only memory (ROM) 1002, a random access memory (RAM) 1003, an input I/F 1004, a communication I/F 1005, a displaying unit 1006, and a bus 1007 connecting the CPU 1001, the ROM 1002, the RAM 1003, the input I/F 1004, the communication I/F 1005, and the displaying unit 1006. The information processing apparatuses 100 and 800 have a hardware configuration using a normal computer.

The printer driver program executed by the information processing apparatuses 100 and 800 of the embodiments is provided by being recorded in a computer-readable recording medium such as a compact disk-read only memory (CD-ROM), a flexible disk (FD), a compact disk-recordable (CD-R), a digital versatile disk (DVD), and the like in a file of an installable form or an executable form.

The printer driver program executed by the information processing apparatuses 100 and 800 of the embodiments may be stored in a computer connected to a network such as the Internet, and provided by being downloaded through the network. The printer driver program executed by the information processing apparatus 100 of the embodiments may be provided or distributed through a network such as the Internet.

The printer driver program of the embodiments may be provided by being incorporated in a ROM or the like in advance.

The printer driver program executed by the information processing apparatuses 100 and 800 of the embodiments has a module structure including the units (the print setting module, the communicating unit, the drawing module, the job command generation module storage unit, and the drawing command generation module storage unit) described above. The units are loaded on the main storage device (RAM 1003) because the CPU 1001 as an actual hardware reads the printer driver program from the storage medium and executes the program. Accordingly, the print setting module, the communicating unit, the drawing module, the job command generation module storing unit, and the drawing command generation module storage unit are generated on the RAM 1003.

According to the present invention, it is possible to correspond to a plurality of types of printers to which different job commands and drawing commands are sent.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A printer driver comprising:
   a job command generation module storage unit configured to store therein a plurality of job command generation modules that generates a job command related to a print job for a printer;
   a drawing command generation module storage unit configured to store therein a plurality of drawing command generation modules that are different from the job command generation modules and generates a drawing command describing a drawing image to instruct a printer to print the image;
   a determining unit configured to determine a combination of a job command generation module stored in the job command generation module storage unit and a drawing command generation module stored in the drawing command generation module storage unit to be used for a printer by which printing is performed;
   a generation requesting unit configured to request the job command generation module and the drawing command generation module determined by the determining unit to generate a command; and
   a transmitting unit configured to transmit a job command generated by the job command generation module and a drawing command generated by the drawing command generation module to the printer by which printing is performed.

2. The printer driver according to claim 1, wherein the determining unit is configured to determine the job command generation module and the drawing command generation module based on a selecting operation of a user.

3. The printer driver according to claim 1, wherein the determining unit is configured to determine the job command generation module and the drawing command generation module corresponding to the printer, by communicating with the printer by which printing is performed.

4. The printer driver according to claim 1, wherein the generation requesting unit is configured to request the job command generation module or the drawing command generation module to generate a command corresponding to a specific timing in a printing sequence.

5. The printer driver according to claim 4, wherein the specific timing is at least one of start printing, start of a document, start of a page, end of the page, end of the document, and end of printing.

6. An information processing apparatus comprising:
   a job command generation module storage unit configured to store therein a plurality of job command generation modules that generates a job command related to a print job for a printer;
   a drawing command generation module storage unit configured to store therein a plurality of drawing command generation modules that are different from the job command generation modules and generates a drawing command describing a drawing image to instruct a printer to print the image;
   a determining unit configured to determine a combination of a job command generation module stored in the job command generation module storage unit and a drawing command generation module stored in the drawing command generation module storage unit to be used for a printer by which printing is performed;
   a generation requesting unit configured to request the job command generation module and the drawing command generation module determined by the determining unit to generate a command; and
   a transmitting unit configured to transmit a job command generated by the job command generation module and a drawing command generated by the drawing command generation module to the printer by which printing is performed.

7. The information processing apparatus according to claim 6, wherein the determining unit is configured to determine the job command generation module and the drawing command generation module based on a selecting operation of a user.

8. The information processing apparatus according to claim 6, wherein the determining unit is configured to determine the job command generation module and the drawing command generation module corresponding to the printer, by communicating with the printer by which printing is performed.

9. The information processing apparatus according to claim 6, wherein the generation requesting unit is configured to request the job command generation module or the drawing command generation module to generate a command corresponding to a specific timing in a printing sequence.

10. The information processing apparatus according to claim 9, wherein the specific timing is at least one of start of printing, start of a document, start of a page, end of the page, end of the document, and end of printing.

11. A non-transitory computer readable storage medium having computer-readable program codes embodied in the medium for processing information in an information processing apparatus that includes a job command generation module storage unit, a drawing command generation module storage unit, a determining unit, a generation requesting unit, and a transmitting unit, the program codes when executed causing a computer to execute:

storing, in the job command module storage unit, a plurality of job command generation modules that generates a job command related to a print job for a printer;

storing in the drawing command generation module storage unit, a plurality of drawing command generation modules that are different from the job command generation modules and generates a drawing command describing a drawing image to instruct a printer to print the image;

determining, using the determining unit, a combination of a job command generation module stored in the job command generation module storage unit and a drawing command generation module stored in the drawing command generation module storage unit to be used for a printer by which printing is performed;

generating, using the generation requesting unit, the job command generation module and the drawing command generation module determined by the determining unit to generate a command; and transmitting, using the transmitting unit, a job command generated by the job command generation module and a drawing command generated by the drawing command generation module to the printer by which printing is performed.

* * * * *